United States Patent
Kim et al.

(10) Patent No.: US 10,306,499 B2
(45) Date of Patent: *May 28, 2019

(54) METHOD AND APPARATUS FOR PERFORMING MEASUREMENT IN AN EXTENSION CARRIER

(71) Applicant: LG ELECTRONICS INC., Seoul (KR)

(72) Inventors: Soyeon Kim, Anyang (KR); Sungho Moon, Anyang (KR); Jaehoon Chung, Anyang (KR); Minseok Noh, Anyang (KR)

(73) Assignee: LG ELECTRONICS INC., Seoul (KR)

( * ) Notice: Subject to any disclaimer, the term of this patent is extended or adjusted under 35 U.S.C. 154(b) by 171 days.

This patent is subject to a terminal disclaimer.

(21) Appl. No.: 15/163,459

(22) Filed: May 24, 2016

(65) Prior Publication Data

US 2016/0302099 A1 Oct. 13, 2016

Related U.S. Application Data

(63) Continuation of application No. 13/521,697, filed as application No. PCT/KR2011/000748 on Feb. 1, 2011, now Pat. No. 9,369,882.

(Continued)

(30) Foreign Application Priority Data

Jan. 31, 2011 (KR) ........................ 10-2011-0009784

(51) Int. Cl.
*H04W 24/10* (2009.01)
*H04W 24/00* (2009.01)
(Continued)

(52) U.S. Cl.
CPC ........... *H04W 24/10* (2013.01); *H04L 1/0026* (2013.01); *H04L 1/0031* (2013.01); *H04L 5/001* (2013.01);
(Continued)

(58) Field of Classification Search
CPC .... H04W 24/00; H04L 43/50; H04L 43/0852; H04L 43/08; H04B 17/003
See application file for complete search history.

(56) References Cited

U.S. PATENT DOCUMENTS 8,280,391 B2  10/2012  Kim et al.
8,488,691 B2   7/2013  Chrabieh et al.
(Continued)

FOREIGN PATENT DOCUMENTS

KR  10-2011-0020170 A   3/2011
KR  10-2011-0083659 A   7/2011
KR     10-1328967 B1   11/2013

*Primary Examiner* — Zhiren Qin

(74) *Attorney, Agent, or Firm* — Birch, Stewart, Kolasch & Birch, LLP

(57) ABSTRACT

A method for channel measurement is provided when a mobile terminal is configured with a primary component carrier and a secondary component carrier. The mobile terminal receives configuration information for channel measurement in the secondary component carrier from a base station. The mobile terminal derives the channel measurement in the secondary component carrier based on a channel state information reference signal (CSI-RS) when the configuration information includes a first indicator indicating that CSI-RS is used for the channel measurement in the secondary component carrier, or deriving the channel measurement in the secondary component carrier based on a cell-specific reference signal (CRS) when the configuration information does not include the first indicator.

16 Claims, 14 Drawing Sheets

Related U.S. Application Data

(60) Provisional application No. 61/300,446, filed on Feb. 2, 2010.

(51) Int. Cl.
*H04W 76/27* (2018.01)
*H04L 5/00* (2006.01)
*H04L 1/00* (2006.01)
*H04W 72/04* (2009.01)

(52) U.S. Cl.
CPC ....... *H04W 24/00* (2013.01); *H04W 72/0446* (2013.01); *H04W 76/27* (2018.02)

(56) References Cited

U.S. PATENT DOCUMENTS

| | | | |
|---|---|---|---|
| 2006/0013338 A1* | 1/2006 | Gore | H04L 5/005 375/324 |
| 2009/0010282 A1 | 1/2009 | Fallon et al. | |
| 2009/0175243 A1 | 7/2009 | Han et al. | |
| 2009/0316659 A1 | 12/2009 | Lindoff et al. | |
| 2010/0015967 A1 | 1/2010 | Perets et al. | |
| 2010/0020771 A1* | 1/2010 | Ji | H04L 1/0004 370/336 |
| 2010/0020852 A1 | 1/2010 | Erell et al. | |
| 2010/0046651 A1* | 2/2010 | Jongren | H04B 7/0689 375/260 |
| 2010/0265901 A1* | 10/2010 | Koo | H04L 5/0007 370/329 |
| 2011/0170496 A1* | 7/2011 | Fong | H04L 5/0053 370/329 |
| 2012/0039365 A1* | 2/2012 | Suzuki | G01S 19/05 375/147 |
| 2012/0092989 A1* | 4/2012 | Baldemair | H04W 24/10 370/230 |

\* cited by examiner (a)

(b)

METHOD AND APPARATUS FOR PERFORMING MEASUREMENT IN AN EXTENSION CARRIER

CROSS-REFERENCE TO RELATED APPLICATIONS

This Application is a Continuation of U.S. patent application Ser. No. 13/521,697 filed on Dec. 10, 2012 (now U.S. Pat. No. 9,369,882 issued on Jun. 14, 2016), which is filed as the National Phase of PCT/KR2011/000748 filed on Feb. 1, 2011, which claims the benefit under 35 U.S.C. § 119(e) to U.S. Provisional Application No. 61/300,446 filed on Feb. 2, 2010, and under 35 U.S.C. § 119(a) to Korean Patent Application No. 10-2011-0009784 filed on Jan. 31, 2011, all of which are hereby expressly incorporated by reference into the present application.

BACKGROUND OF THE INVENTION

The present disclosure relates to wireless (radio) communication, and more particularly, a method for performing measurement in an extension carrier, and an apparatus using the same.

Brief description will be given of a Third Generation Partnership Project Long Term Evolution (3GPP LTE) and LTE-Advanced (LTE-A) as one example of a mobile communication system to which the present description is applicable.

At least one cell exists in one base station. The cell sets one carrier to one of bandwidths, such as 1.25, 2.5, 5, 10, 15, 20 MHz and the like, so as to provide downlink and uplink transport services to several User Equipments (UEs). Here, different cells may be set to provide different bandwidths. The base station controls data transmission and reception for a plurality of UEs. For downlink data, the base station transmits downlink scheduling information to a corresponding UE so as to notify time and frequency domains to which data is to be transmitted, and information related to encoding, data size, Hybrid Automatic Repeat request (HARQ), and the like. Also, for uplink data, the base station transmits uplink scheduling information to the corresponding UE to notify time and frequency domains which can be used by the corresponding UE, and information related to encoding, data size, HARQ and the like. An interface for transmission of user traffic or control traffic may be used between the base stations.

Although the wireless communication technology developed based on Wideband Code Division Multiple Access (WCDMA) has been evolved into LTE, requirements and expectation of users and providers have continued to increase. Also, since another wireless access technology is being developed. New technical evolutions are required for competitiveness in the future. In this respect, reduction of cost per bit, increase of service availability, flexible use of frequency bands, simplified structure, open type interface, proper power consumption of a UE and the like, are needed.

In recent time, standardization of the advanced technology of LTE is in progress under the 3GPP. The technology is referred to as 'LTE-A' in this specification. One of important differences between the LTE system and the LTE-A system is difference in system bandwidth and an introduction of a relay.

The LTE-A system aims at supporting a wideband to extend up to 100 MHz. To this end, the system uses a carrier aggregation or bandwidth aggregation that achieves a wideband using a plurality of frequency blocks. The carrier aggregation uses a plurality of frequency blocks as one great logical frequency band in order to use a wider frequency band.

A bandwidth of each frequency block may be defined based on a bandwidth of a system block used in the LTE system. Each frequency block is transmitted using a Component Carrier (CC).

SUMMARY OF THE INVENTION

Therefore, an aspect of the detailed description is to provide a setting method for performing measurement in an extension component carrier in a wireless communication system using a carrier aggregation, and a measurement method for a UE using the same.

To achieve these and other advantages and in accordance with the purpose of the present invention, as embodied and broadly described herein, there is provided an operation method for a User Equipment (UE) to perform channel quality measurement in a system supporting a carrier aggregation.

The method may include receiving a first message including a first indicator from a base station, the first indicator indicating control information for channel quality measurement used in an extension component carrier, receiving the control information corresponding to the first indicator from the base station through the extension component carrier, and performing channel quality measurement in the extension component carrier using the received control information.

The control information for channel quality measurement may be one of a Common Reference Signal (CRS), a Channel State Indication Reference Signal (CSI-RS), and a Synchronization Channel (SCH).

The first indicator may indicate one of the control information for channel quality measurement.

The first message may be one of a Physical Downlink Control Channel (PDCCH), a Radio Resource Control (RRC) signaling message and a broadcast message.

The first indicator may be transmitted in every subframe when the first message is the PDCCH.

The first indicator may be transmitted after establishing an RRC connection, one time or periodically when the first message is the RRC signaling message.

The first indicator may be transmitted once after establishing the RRC connection when the first message is the broadcast message.

The method may further include receiving a second indicator indicating a position of the control information.

The first message may be a carrier configuration message for the extension component carrier.

When the control information for channel quality measurement is a Common Reference Signal (CRS) or a Channel State Indication Reference Signal (CSI-RS), the received control information may be a CRS or CSI-RS with a reduced Reference Signal Density (RSD).

When the control information for channel quality measurement is a Common Reference Signal (CRS), the received control information may be a CRS with a reduced Reference Signal Density (RSD) for at least one of first and second antennas.

When the channel quality measurement control information is a Common Reference Signal (CRS), the received control information may be a CRS with a first or second slot removed.

In accordance with one exemplary embodiment of the present disclosure, there is provided a User Equipment (UE)

for performing channel quality measurement in a system supporting a carrier aggregation.

The UE may include a memory, a radio frequency unit configured to transmit and receive an external signal and a radio signal, and a controller configured to receive a first message including a first indicator from a base station, the first indicator indicating control information for channel quality measurement used in an extension component carrier, receive the control information corresponding to the first indicator via the extension component carrier, and perform channel quality measurement in the extension component carrier using the received control information.

In accordance with exemplary embodiments of the detailed description, a UE may set control information for measurement in an extension component carrier in a radio communication system using a carrier aggregation. To this end, the UE may receive information related to the measurement method in the extension component carrier from a base station so as to perform such measurement.

Also, in accordance with the exemplary embodiments of the detailed description, the UE may perform measurement in the extension component carrier using a reference signal with a reduced reference signal density, thereby decreasing inefficiency due to the reference signal.

The effects to be obtained in the present description may not be limited to those mentioned effects, but other effects which have not been mentioned may be obviously understood by those skilled in the art through the following description.

DETAILED DESCRIPTION OF THE EMBODIMENTS

Figure 1:
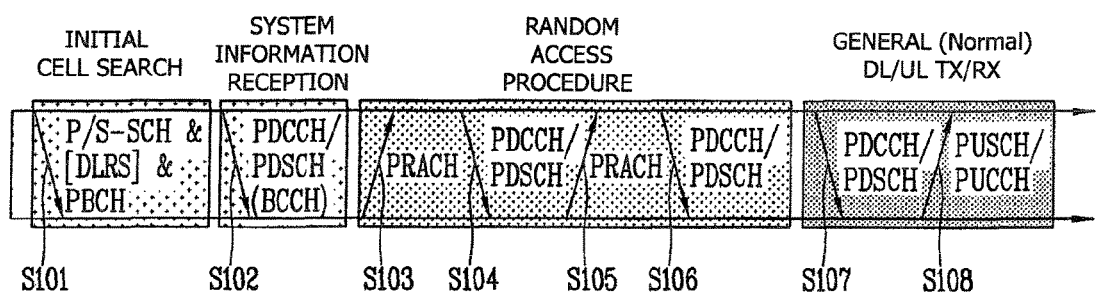
FIG. 1 is a view illustrating physical channels used in a 3GPP system, and a general signal transmission method using the channels.

Embodiments of the present invention will be described below in detail with reference to the accompanying drawings. Detailed description to be disclosed herein with the accompanying drawings is to describe illustrative embodiments, other than illustrates only one embodiment for implementing the present disclosure. The detailed description disclosed herein may include details for the sake of full understanding of the present disclosure. However, it will be obvious to those skilled in the art that the present disclosure can be executed without those details. For example, the detailed description disclosed herein is given under assumption that a mobile communication system is 3GPP LTE and LTE-A systems, but may be applicable to other random mobile communication systems, except for specific features of the 3GPP LTE and LTE-A systems.

In some cases, in order to prevent the conception of the present disclosure from being obscure, well-known structure and device will be omitted or be illustrated in a form of a block diagram based on a main function of each structure and device. Also, the same reference numerals will be used for the same components over the specification.

In addition, for the sake of explanation, it is assumed that a terminal indicates a mobile or stationary user end device, such as a User Equipment (UE), a Mobile Station (MS), an Advanced Mobile Station (AMS) and the like. It is also assumed that the base station indicates a random node of a network end which communicates with a UE. The base station may include a Node B, an eNode B, a Base Station (BS), an Access Point (AP) and the like. The relay may be called a Relay Node (RN), a Relay Station (RS) and the like.

The UE and the relay in the mobile terminal communication system may receive information from the base station in downlink, and transmit information in uplink. Those information that the UE and the relay transmit or receive may include data and various information. There are various types of physical channels according to types of information that the UE and the relay transmit or receive.

Description of FIG. 1

FIG. 1 is a view illustrating physical channels used in a 3GPP system, and a general signal transmission method using the channels.

A UE may perform an initial cell search operation, such as synchronizing with a base station when power is turned on or it newly enters a cell, (S101). To this end, the UE may synchronize with the base station by receiving a Primary Synchronization Channel (P-SCH) and a Secondary Synchronization Channel (S-SCH) from the base station, and thus acquire information related to a cell ID and the like. Afterwards, the UE may acquire broadcast information within the cell by receiving a Physical Broadcast Channel (PBCH) from the base station. In the meantime, the UE may identify the status of a downlink channel by receiving a Downlink Reference Signal (DL RS) in the initial cell search step.

After completion of the initial cell search, the UE may acquire more detailed system information by receiving a Physical Downlink Control Channel (PDCCH) and a Physical Downlink Shared Channel (PDSCH) based on information carried in the PDCCH (S102).

In the meantime, when the UE initially accesses the base station or has no radio (wireless) resource to transmit a signal, the UE may perform a random access procedure for the base station (S103 to S106). To this end, the UE may transmit a preamble of a specific sequence through a Physical Random Access Channel (PRACH) (S103 and S106), and receive a response message to the preamble through the PDCCH and the PDSCH corresponding to the PDCCH (S104 and S106). For a contention-based RACH, the UE may additionally perform a contention resolution procedure.

After performing the foregoing steps, the UE may perform a general uplink and downlink signal transmission procedure, namely, receive the PDCCH/PDSCH (S107), and transmit a Physical Uplink Shared Channel (PUSCH)/Physical Uplink Control Channel (PUCCH) (S108). Information that the UE transmits to the base station or receives from the base station over uplink may include downlink/uplink Acknowledgement/Negative-ACK (ACK/NACK) signals, a Channel Quality Indicator (CQI), a Precoding Matrix Index (PMI), a Rank Indicator (RI) and the like. In case of the 3GPP LTE system, the UE may transmit the information, such as the CQI/PMI/RI, through the PUSCH and/or the PUCCH.

Figure 2:
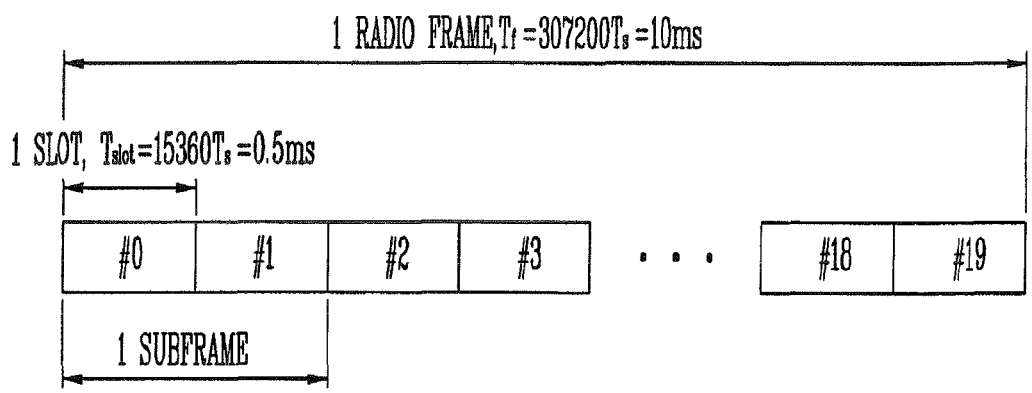
FIG. 2 is a view illustrating a structure of a wireless (radio) frame used in a 3GPP LTE system as one example of a mobile communication system.

Description of FIG. 2

FIG. 2 is a view illustrating a structure of a radio frame used in a 3GPP LTE system as one example of a mobile communication system.

Referring to FIG. 2, one radio frame has a length of 10 ms (307200 Ts) and includes 10 subframes of a uniform size. Each subframe has a length of 1 ms and includes 2 slots. Each slot has a length of 0.5 ms (15360 Ts). Here, Ts denotes a sampling time, and is expressed by $Ts=1/(15 \text{ kHz} \times 2048) = 3.1552 \times 10^{-8}$ (approximately, 33 ns). The slot includes a plurality of Orthogonal Frequency Division Multiplexing (OFDM) symbols or Single Carrier-Frequency Division Multiple Access (SC-FDMA) symbols in a time domain, and includes a plurality of resource blocks (RBs) in a frequency domain.

In the LTE system, one RB includes 12 subcarriers×7(6) OFDM symbols or SC-FDMA symbols. A Transmission Time Interval (TTI) which is a transmission unit time of data may be determined in a unit of one or more subframes. The aforementioned radio frame structure is merely illustrative, and various modifications may be made in the number of subframes included in the radio frame or the number of slots included in the subframe, or the number of OFDM symbols or SC-FDMA symbols included in the slot.

Description of FIGS. 3(a) and 3(b)

FIG. 3(a) is a view illustrating a structure of downlink subframes of the 3GPP LTE system, and FIG. 3(b) is a view illustrating a structure of uplink subframes of the 3GPP LTE system, as one example of the mobile communication system.

Referring to FIG. 3(a), one downlink subframe includes two slots in a time domain. First one to three OFDM symbols of a first slot within one subframe correspond to a control region to which a control channel is allocated. The remaining OFDM symbols correspond to a data region to which a PDSCH is allocated.

Examples of the downlink control channels used in the 3GPP LTE system include, for example, a Physical Control Format Indicator Channel (PCFICH), a Physical Downlink Control Channel (PDCCH), a Physical Hybrid automatic repeat request Indicator Channel (PHICH), etc. The PCFICH is transmitted at a first OFDM symbol of a subframe, and includes information about the number of OFDM symbols (i.e., a size of the control region) used to transmit the control channel in the subframe. Control information transmitted through the PDCCH is referred to as Downlink Control Information (DCI). The DCI includes uplink or downlink resource allocation information or an uplink transmission power control command for a certain UE group. The PHICH includes an ACK/NACK signal as a response to uplink transmission. That is, the ACK/NACK signal responsive to uplink data transmitted by the UE is transmitted on the PHICH.

Hereinafter, brief description will be given of the PDCCH as the downlink physical channel. Detailed description of the PDCCH will be given later with reference to FIGS. 5 to 8.

The base station may transmit, via the PDCCH, resource allocation and transmission format for the PDSCH (referred to as 'DL grant'), resource allocation information related to the PUSCH (referred to as 'UL grant'), a random UE, a set of transmission power control commands for individual UEs within a group, activation of Voice over Internet Protocol (VoIP), and the like. A plurality of PDCCHs may be transmitted within the control region, and the UE may monitor the plurality of PDCCHs. The PDCCH may include an aggregation of one or several continuous Control Channel Elements (CCEs).

The PDCCH including the aggregation of one or several continuous CCEs may be transmitted via the control region after completion of a subblock interleaving. The CCE is a logical allocation unit used to provide the PDCCHs with a coding rate based on the state of a radio channel. The CCE corresponds to a plurality of resource element groups. The format of the PDCCH and the number of available bits of the PDCCH are determined based on a correlation between the number of CCEs and the coding rate provided by the CCEs.

The control information transmitted via the PDCCH is called the DCI. The following table 1 shows the DCI according to a DCI format.

TABLE 1

| DCI Format | Description |
|---|---|
| Format 0 | used for the scheduling of PUSCH |
| Format 1 | used for the scheduling of one PDSCH codeword |
| Format 1A | used for the compact scheduling of one PDSCH codeword and random access procedure |
| Format 1B | used for the compact scheduling of one PDSCH codeword with precoding information |
| Format 1C | used for very compact scheduling of one PDSCH codeword |
| Format 1D | used for the compact scheduling of one PDSCH codeword with precoding and power offset information |

TABLE 1-continued

| DCI Format | Description |
| --- | --- |
| Format 2 | used for scheduling PDSCH to UEs configured in closed-loop spatial multiplexing node |
| Format 2A | used for scheduling PDSCH to UEs configured in open-loop spatial multiplexing mode |
| Format 3 | used for the transmission of TPC commands for PUCCH and PUSCH with 2-bit power adjustments |
| Format 3A | used for the transmission of TPC commands for PUCCH and PUSCH with 1-bit power adjustments |

A DCI format 1 denotes uplink resource allocation information, DCI formats 1-2 denote downlink resource allocation information, DCI format 3 or 3A denotes an uplink Transmit Power Control (TPC) Command for Random UE Groups.

Hereinafter, description will be briefly given of a method in which a base station maps a resource for transmission of the PDCCH in the LTE system.

In general, the base station may transmit scheduling allocation information and other control information on the PDCCH. A physical control channel may be transmitted as one aggregation or a plurality of CCEs. One CCE may include 9 Resource Element Groups (REGs). The number of REGs failing to be allocated to the PCFICH or PHICH, is $N_{REG}$, Available CCEs in the system are from 0 to $N_{CCE-1}$ (here, $N_{CCE}=\lfloor N_{REG}/9 \rfloor$). The PDCCH, as shown in the following table, supports a multiple format. One PDCCH including n contiguous CCEs starts with a CCE which executes '1 mod n=0' (where i is a CCE number). Multiple PDCCHs may be transmitted on one subframe.

TABLE 2

| PDCCH format | Number of CCEs | Number of resource-element groups | Number of PDCCH bits |
| --- | --- | --- | --- |
| 0 | 1 | 9 | 72 |
| 1 | 2 | 18 | 144 |
| 2 | 4 | 36 | 288 |
| 3 | 8 | 72 | 576 |

Referring to Table 2, the base station may determine a PDCCH format based on how many regions will send receive control information or the like. The UE may reduce overhead by reading such control information or the like by a CCE unit. Similarly, a relay may read such control information or the like by an R-CCE unit. In the LTE system, resource elements may be mapped in a unit of a Relay-Control Channel Element (R-CCE) to transmit an R-PDCCH for a random relay.

Referring to FIG. 3(b), an uplink subframe may be divided into a control region and a data region in a frequency domain. The control region may be allocated to a PUCCH carrying uplink control information. The data region may be allocated to a PUSCH carrying user data. In order to maintain a single carrier characteristic, one UE does not simultaneously transmit the PUCCH and the PUSCH. The PUCCH for one UE is allocated to an RB pair in a subframe. RBs belonging to the RB pair occupy different subcarriers in respect to two slots. Thus, the RB pair allocated to the PUCCH is frequency-hopped at a slot edge.

Figure 4:
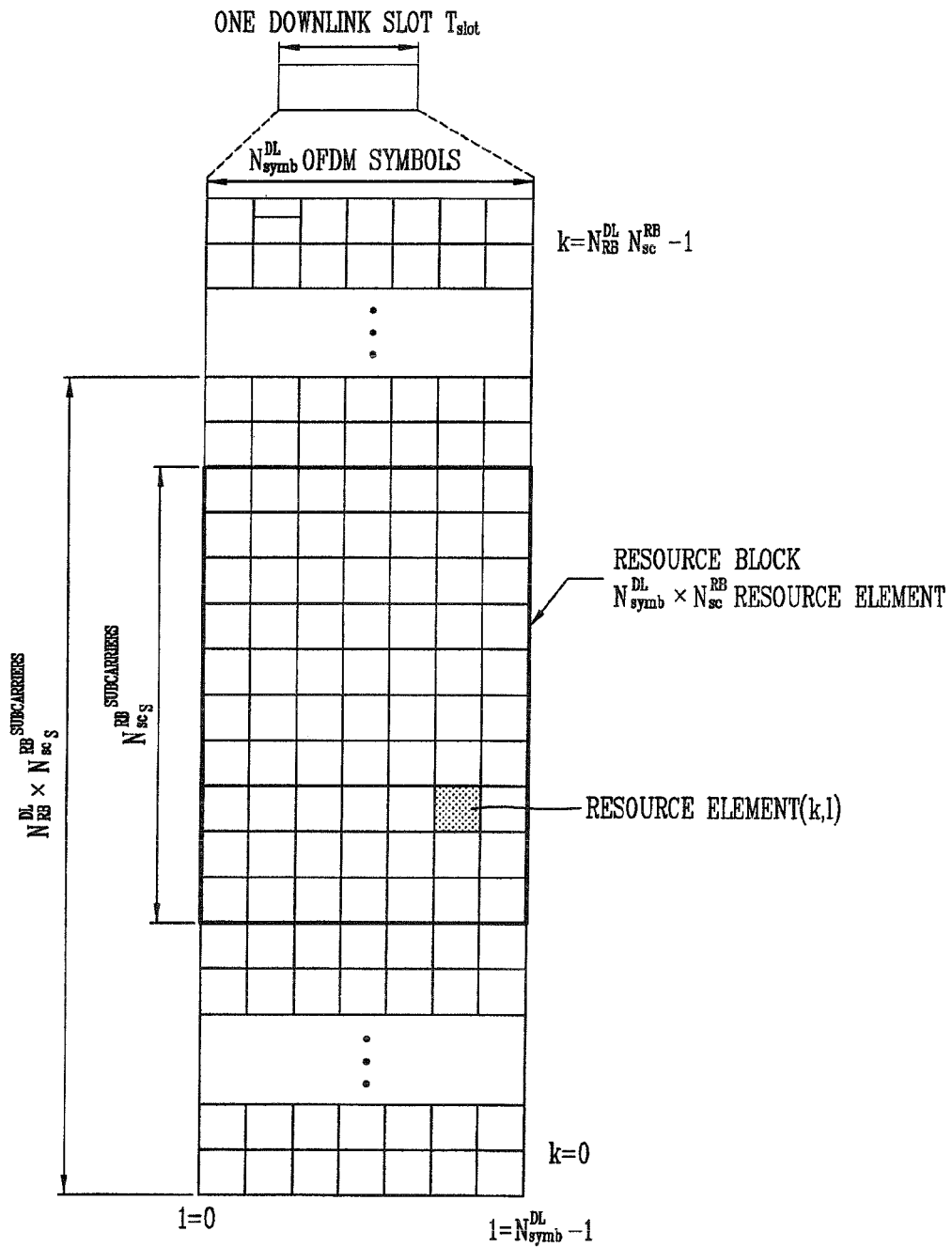
FIG. 4 is a view illustrating a downlink time-frequency resource grid structure used in the present description.

Description of FIG. 4

FIG. 4 is a view illustrating a downlink time-frequency resource grid structure used in the present description.

A downlink signal transmitted in each slot has a resource grid structure including $N_{RB}^{DL} \times N_{SC}^{RB}$ subcarriers and $N_{symb}^{DL}$ OFDM symbols. Here, $N_{RB}^{DL}$ denotes the number of RBs in downlink, $N_{SC}^{RB}$ denotes the number of subcarriers included in one RB, and $N_{symb}^{DL}$ denotes the number of OFDM symbols in a downlink slot. The size of $N_{RB}^{DL}$ may vary according to a downlink transmission bandwidth configured within a cell, and should satisfy $N_{RB}^{min,DL} \leq N_{RB}^{DL} \leq N_{RB}^{max,DL}$. Here, $N_{RB}^{min,DL}$ denotes the smallest downlink bandwidth supported by a wireless communication system, and $N_{RB}^{max,RB}$ denotes the greatest downlink bandwidth supported by a wireless communication system. $N_{RB}^{min,DL}$ may be 6 and $N_{RB}^{max,RB}$ may be 110, but the present disclosure may not be limited to those numbers. The number of OFDM symbols included in one slot may depend on a length of Cyclic Prefix (CP) and an interval between subcarriers. For a multi-antenna transmission, one resource grid may be defined for one antenna port.

Each element within the resource grid for each antenna port may be referred to as a Resource Element (RE), and be uniquely identified by an index pair (k,l) in a slot. Here, k denotes an index in the frequency domain, and l denotes an index in the time domain . . . k has one value of 0, . . . , $N_{RB}^{DL} N_{SC}^{Rb}-1$, and l has one value of 0, . . . , $N_{symb}^{DL-1}$.

The resource block shown in FIG. 4 is used to describe a mapping relation between a certain physical channel and the REs. The RB may be divided into a Physical Resource Block (PRB) and a Virtual Resource Block (VRB). One PRB is defined by $N_{symb}^{DL}$ contiguous OFDM symbols in the time domain and $N_{SC}^{RB}$ contiguous subcarriers in the frequency domain. Here, $N_{symb}^{DL}$ and $N_{SC}^{RB}$ may be predetermined values. For example, $N_{symb}^{DL}$ and $N_{SC}^{RB}$ may be given as shown in the following Table 3. Therefore, one PRB includes $N_{symb}^{DL} \times N_{SC}^{RB}$ REs. One PRB corresponds to one slot in the time domain and 180 kHz in the frequency domain, but the present disclosure may not be limited to this.

TABLE 3

| Configuration | | $N_{SC}^{RB}$ | $N_{symb}^{DL}$ |
| --- | --- | --- | --- |
| Normal cyclic prefix | Δf = 15 kHz | 12 | 7 |
| Extended cyclic prefix | Δf = 15 kHz | | 6 |
| | Δf = 7.5 kHz | 24 | 3 |

The PRB has a value in the range of 0 to $N_{RB}^{DL-1}$ in the frequency domain. A relation between a PRB number (nPRB) in the frequency domain and an RE (k,l) within one slot may meet $$n_{PRB} = \left\lfloor \frac{k}{N_{SC}^{RB}} \right\rfloor.$$

The size of the VRB is the same as that of the PRB. The VRB may be defined in a manner of being categorized into a Localized VRB (LVRB) and a Distributed VRB (DVRB). For the VRB of each type, a single VRB number (nVRB) may be allocated a pair of VRBs present in two slots within one subframe.

The VRB may have the same size as that of the PRB. The VRB is defined as two types. The first type is an LVBR, and the second type is a DVRB. For each type of VRB, a pair of VRBs are allocated across two slots of one subframe with a single VRB index (hereinafter, named a VRB number). In other words, $N_{RB}^{DL}$ VRBs, which belong to a first slot of two slots configuring one subframe, is allocated with one index selected from a group consisting of 0 to $N_{RB}^{DL-1}$, and $N_{RB}^{DL}$ VRBs, which belong to a second slot of the two slots, is similarly allocated with one selected from the group consisting of 0 to $N_{RB}^{DL-1}$.

Figure 3:
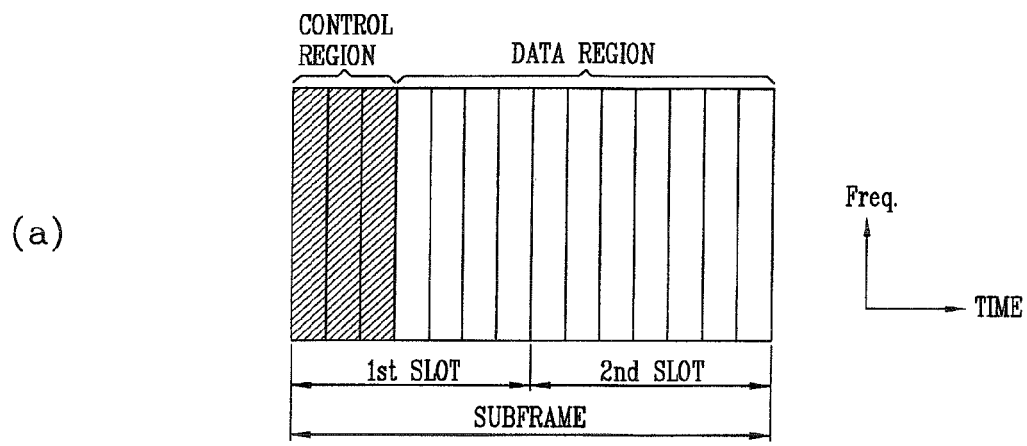
FIG. 3 is a view illustrating (a) a structure of downlink subframes of the 3GPP LTE system, and (b) a structure of uplink subframes of the 3GPP LTE system, as one example of the mobile communication system.
Figure 3:
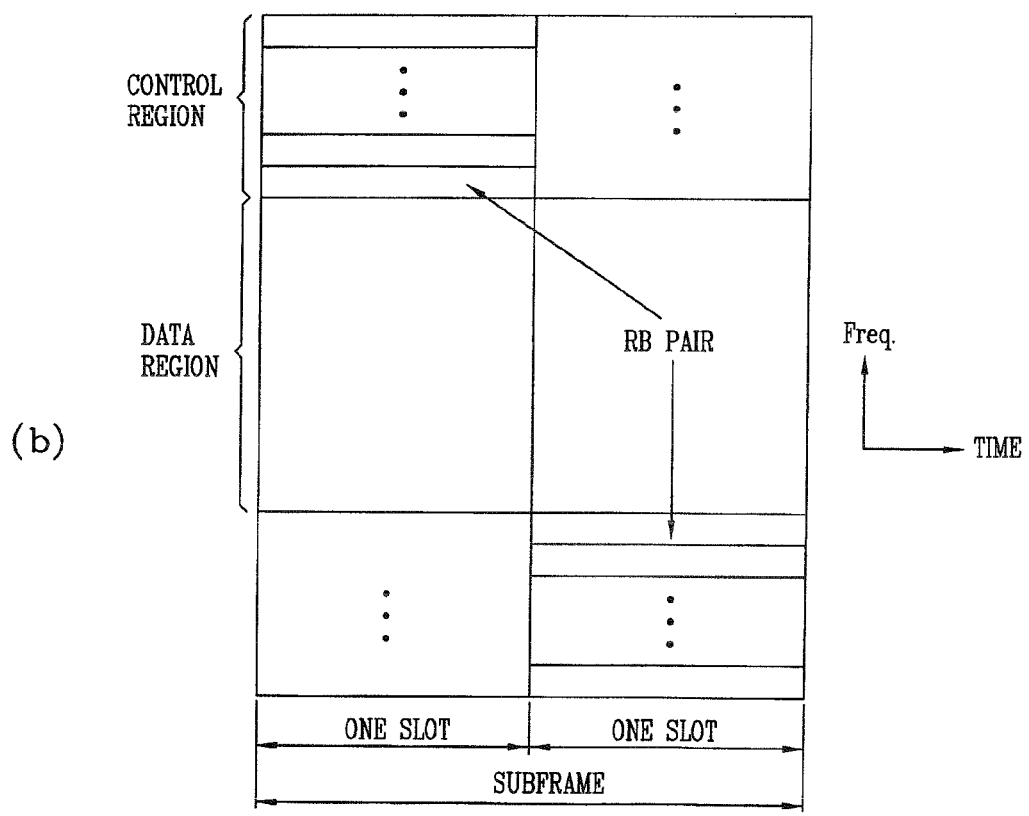

The radio frame structure, the downlink and uplink subframes, the downlink time-frequency resource grid structure and the like, shown in FIGS. 2 to 4, may also be applicable between a base station and a relay.

Figure 5:
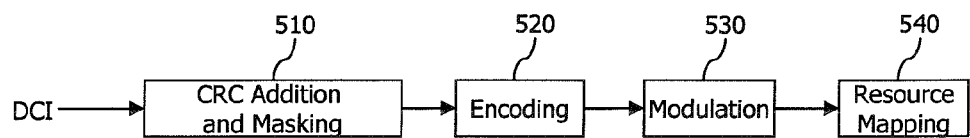
FIG. 5 is a block diagram illustrating a configuration of PDCCH.

Description of FIG. 5

Hereinafter, a process that a base station transmits a PDCCH to a UE in the LTE system will be described.

FIG. 5 is a block diagram illustrating a configuration of a PDCCH.

The base station may determine a PDCCH format according to a DCI to send to a UE, attach a Cyclic Redundancy Check (CRC) to the DCI, and mask the CRC with a unique identifier (it is referred to as Radio Network Temporary Identifier (RNTI)) according to an owner or usage of the PDCCH (510).

If a PDCCH is for a specific UE, the CRC may be masked with a unique identifier of the UE, for example, Cell-RNTI (C-RNTI). Alternatively, if a PDCCH is for a paging message, the CRC may be masked with a paging indicator, for example, Paging-RNTI (P-RNTI). Also, if a PDCCH is for system information, the CRC may be masked with a system information identifier, namely, System Information-RNTI (SI-RNTI). A Random Access-RNTI (RA-RNTI) may be used to mask the CRC so as to instruct a random access response to a transmission of a random access preamble from the UE. Also, TPC-RNTI may be used to mask the CRC to instruct a TPC command for a plurality of UEs.

Upon use of the C-RNTI, the PDCCH may carry (load) control information for a specific UE (named a UE-specific control information). Upon use of another RNTI, the PDCCH may carry common control information that every or a plurality of UEs within a cell receive.

The CRC-added DCI may then be encoded to generate a coded data (520). The encoding may include channel encoding and rate matching.

The coded data may be modulated to generate modulated symbols (530).

The modulated symbols may be mapped to physical REs (540). Each of the modulated symbols may be mapped to the corresponding RE.

Figure 6:
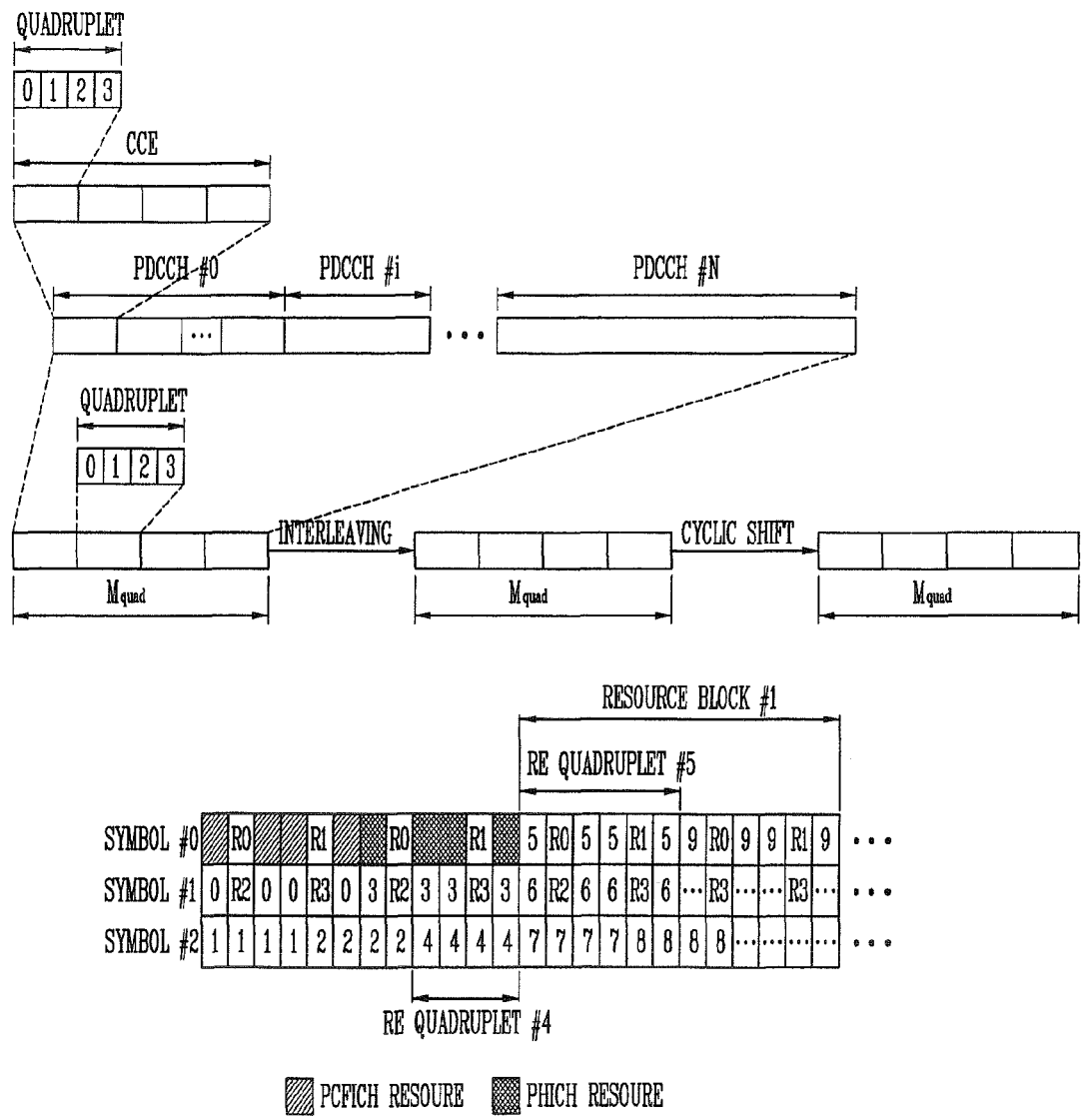
FIG. 6 is a view illustrating an exemplary resource mapping of the PDCCH.

Description of FIG. 6

FIG. 6 is a view illustrating an exemplary resource mapping of the PDCCH.

Referring to FIG. 6, R0 denotes a reference signal of a first antenna, R1 denotes a reference signal for a second antenna, R2 denotes a reference signal for a third antenna, and R3 denotes a reference signal for a fourth antenna.

The control region within the subframe may include a plurality of CCEs. The CCE is a logical allocation unit used to provide the PDCCHs with a coding rate based on the state of a radio channel, and corresponds to a plurality of REGs. The REG includes a plurality of REs. The format of the PDCCH and the number of available bits of the PDCCH are determined based on a correlation between the number of CCEs and the coding rate provided by the CCEs.

One REG (indicated by a quadruplet in the drawing) may include 4 REs, and one CCE may include 9 REGs. {1, 2, 4, 8} CCEs may be used for configuring one PDCCH, and each element of {1, 2, 4, 8} is called a CCE aggregation level.

A control channel including one or more CCEs may execute interleaving in an REG unit, and be mapped to a physical resource after a cyclic shift based on a cell Identifier (ID) is executed.

Figure 7:
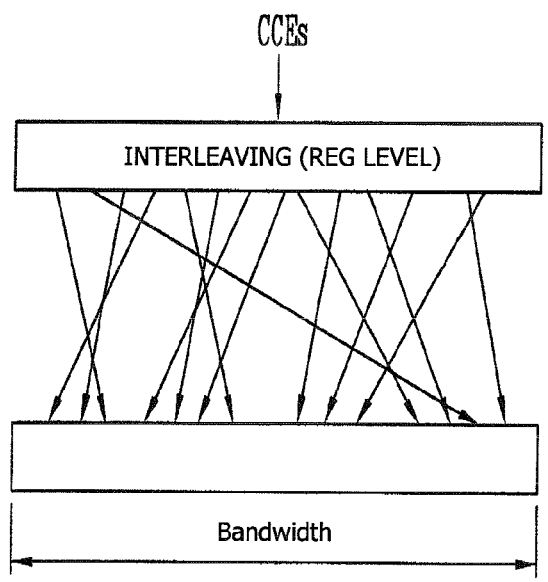
FIG. 7 is a view illustrating an example of distributing CCE in a system band.

Description of FIG. 7

FIG. 7 is a view illustrating an example of distributing CCE in a system band.

Referring to FIG. 7, a plurality of logically contiguous CCEs may be input to an interleaver. The interleaver may execute a function of mixing the plurality of CCEs by the REG unit.

Therefore, the frequency/time resources configuring one CCE may be physically distributed in the entire frequency and time domains within a control region of a subframe. Consequently, the control channel is configured by the CCE unit but the interleaving is performed by the REG unit. This may result in maximizing a frequency diversity and an interference randomization gain.

Figure 8:
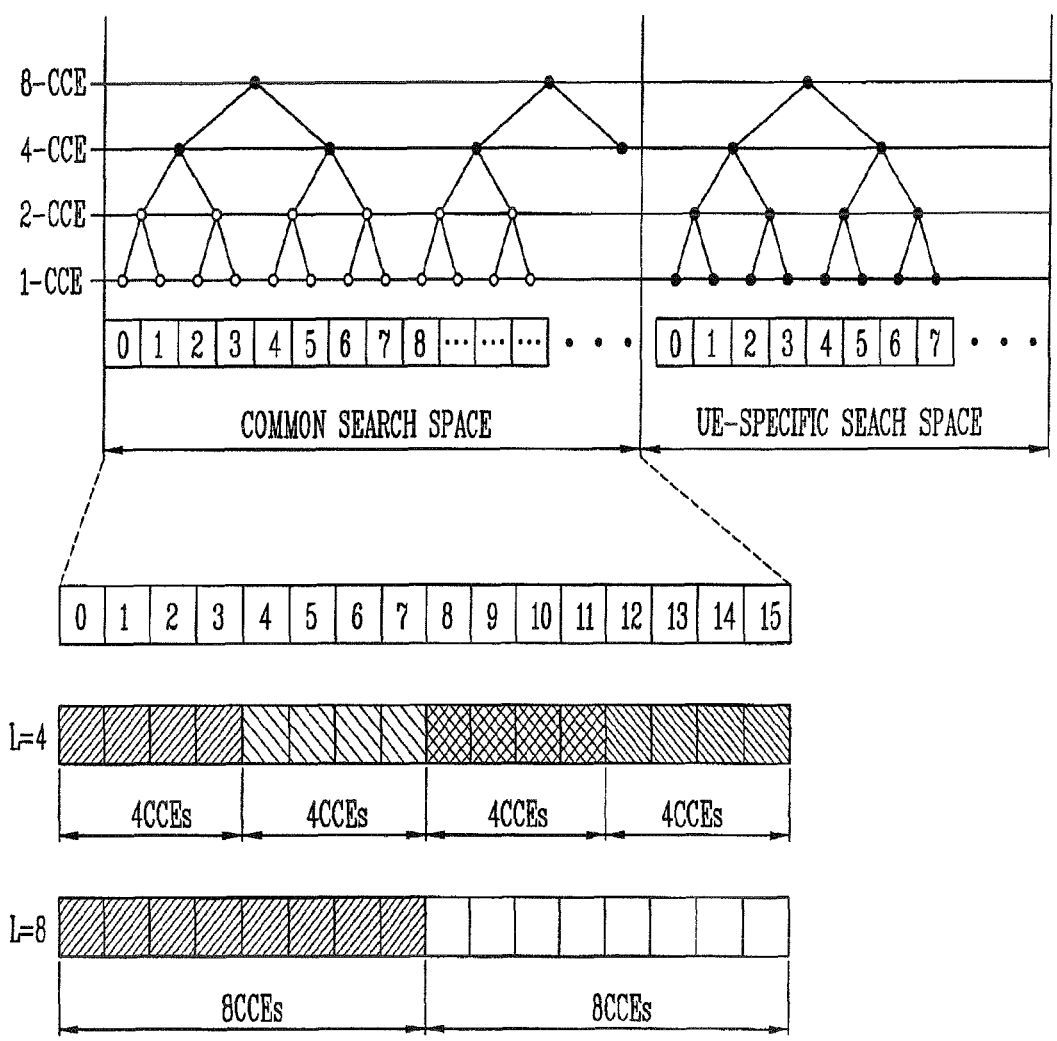
FIG. 8 is an exemplary view illustrating monitoring of the PDCCH.

Description of FIG. 8

FIG. 8 is an exemplary view illustrating monitoring of the PDCCH.

In the 3GPP LTE, a blind decoding is used for detecting a PDCCH. The blind decoding is a scheme that checks CRC error by demasking a desired identifier to the CRC of the received PDCCH (referred to as a candidate PDCCH) so as to confirm whether the corresponding PDCCH is its own control channel. The UE does not know whether the PDCCH of the UE is transmitted using any CCE aggregation level or a DCI format at any position within the control region.

The plurality of PDCCHs may be transmitted within one subframe. The UE may monitor the plurality of PDCCHs in every subframe. Here, the monitoring means allowing the UE to attempt decoding of the PDCCH according to the monitored PDCCH format.

In the 3GPP LTE, a search space is used to reduce a burden due to the blind decoding. The search space may be referred to as a monitoring set of the CCE for the PDCCH. The UE monitors the PDCCH within the corresponding search space.

The search space is divided into a common search space and a UE-specific search space. The common search space, which is a space searching the PDCCH having the common control information, is configured to have 16 CCEs up to CCE index of 0 to 15 and supports the PDCCH having the CCE aggregation level of {4, 8}. However, the PDCCH (DCI format 0, 1A) carrying the UE-specific information may also be transmitted to the common search space. The UE-specific search space supports the PDCCH having the CCE aggregation level of {1, 2, 4, 8}.

The following Table 4 shows the number of PDCCH candidates monitored by the UE.

TABLE 4

| Search Space Type | Aggregation Level L | Size [in CCEs] | Number of PDCCH candidates | DCI formats |
|---|---|---|---|---|
| UE-specific | 1 | 6 | 6 | 0, 1, 1A, 1B, 1D, 2, 2A |
| | 2 | 12 | 6 | |

TABLE 4-continued

| Search Space Type | Aggregation Level L | Size [in CCEs] | Number of PDCCH candidates | DCI formats |
|---|---|---|---|---|
|  | 4 | 8 | 2 |  |
|  | 8 | 16 | 2 |  |
| Common | 4 | 16 | 4 | 0, 1A, 1C, |
|  | 8 | 16 | 2 | 3/3A |

A size of the search space may be set by the Table 4, and a start point of the search space may be defined differently in the common search space and the UE-specific search space. The start point of the common search space may be fixed irrespective of a subframe, but the start point of the UE-specific search space may change for each subframe according to a UE identifier (for example, C-RNTI), a CCE aggregation level and/or a slot number within a radio frame. When the start point of the UE-specific search space is in the common search space, the UE-specific search space and the common search space may overlap each other.

A search space $S^{(L)}_k$ in the aggregation level $L \in \{1,2,3,4\}$ is defined as a set of PDCCH candidates. A CCE corresponding to a PDCCH candidate (m) of the search space $S^{(L)}_k$ is given as follows.

$$L \cdot \{(Y_k+m) \bmod \lfloor N_{CCE,k}/L \rfloor\}+i \qquad \text{[Formula 1]}$$

Here, $i=0, 1, \ldots, L-1$. $M=0, \ldots, M^{(L)}-1$. $N_{CCE,k}$ denotes the entire number of CCEs which can be used for PDCCH transmission within the control region of the subframe k. The control region may include the aggregation of CCEs numbered from 0 to $N_{CCE,k}-1$. $M^{(L)}$ denotes the number of PDCCH candidates in the CCE aggregation level L in a given search space. In the common search space, $Y_k$ is set to 0 with respect to two aggregation levels L=4 and L=8. Also, in the UE-specific search space of the aggregation level L, a variable $Y_k$ is defined as follows.

$$Y_k=(A \cdot Y_{k-1}) \bmod D \qquad \text{[Formula 2]}$$

Here, $Y_{-1}=n_{RNTI} \neq 0$, A=39827, D=65537, k=floor($n_s/2$) and ns denotes a slot number within a radio frame.

When the UE monitors a PDCCH using a C-RNTI, a DCI format and a search space to be monitored may be determined based on a transmission mode of a PDSCH.

The following Table 5 shows an example of PDCCH monitoring for which a C-RNTI is set.

TABLE 5

| Transmission mode | DCI format | Search space | PDSCCH transmission mode according to PDCCH |
|---|---|---|---|
| Mode 1 | DCI format 1A | Common and UE-specific | Single antenna port, port 0 |
|  | DCI format 1 | Ue-specific | Single antenna port, port 0 |
| Mode 2 | DCI format 1A | Common and UE-specific | Transmission diversity |
|  | DCI format 1 | Ue-specific | Transmission diversity |
| Mode 3 | DCI format 1A | Common and UE-specific | Transmission diversity |
|  | DCI format 2A | Ue-specific | Cyclic Delay Diversity (CDD) or transmission diversity |
| Mode 4 | DCI format 1A | Common and UE-specific | Transmission diversity |
|  | DCI format 2 | Ue-specific | Closed-loop spatial multiplexing |
| Mode 5 | DCI format 1A | Common and UE-specific | Transmission diversity |
|  | DCI format 1D | Ue-specific | Multi-user Multiple Input Multiple Output (MU-MIMO) |
| Mode 6 | DCI format 1A | Common and UE-specific | Transmission diversity |
|  | DCI format 1B | Ue-specific | Closed-loop spatial multiplexing |
| Mode 7 | DCI format 1A | Common and UE-specific | Single antenna port, port 0, when the number of PBCH transmission port is 1, while a transmission diversity if not. |
|  | DCI format 1 | Ue-specific | Single antenna port, port 5 |
| Mode 8 | DCI format 1A | Common and UE-specific | Single antenna port, port 0, when the number of PBCH transmission port is 1, while a transmission diversity if not. |
|  | DCI format 2B | Ue-specific | Dual layer transmission (port 7 or 8), or a single antenna port, port 7 or 8 |

Hereinafter, a multiple carrier system will be described.

The 3GPP LTE system supports a case where a downlink bandwidth and an uplink bandwidth are set differently from each other, but one Component Carrier (CC) is a precondition for this case.

This means that, in the state where one CC is defined for each of downlink and uplink, 3GPP LTE supports only a case where the downlink bandwidth is identical with or different from the uplink bandwidth. For example, the 3GPP LTE system may support a maximum of 20 MHz and have different uplink bandwidth and downlink bandwidth, but supports only one CC in each of uplink and downlink.

A spectrum aggregation (also called a bandwidth aggregation or a carrier aggregation) supports a plurality of CCs. The spectrum aggregation is introduced in order to support an increased throughput, prevent an increase of costs due to the introduction of a broadband Radio Frequency (RF), and guarantee compatibility with the existing system. For example, if 5 CCs are assigned as the granularity of a carrier unit having a 20 MHz bandwidth, a maximum bandwidth of 100 MHz can be supported.

The spectrum aggregation may be divided into a contiguous spectrum aggregation performed between continuous carriers in the frequency domain, and a non-contiguous spectrum aggregation performed between non-continuous carriers. When the number of downlink CCs and the number of uplink CCs are the same as each other, it is referred to as a symmetric aggregation.

When different, it is referred to as an asymmetric aggregation.

Also, a combination of a downlink component carrier and an uplink component carrier may be referred to as 'cell'. That is, 'cell' may be used as a concept for a pair of DL CC and UL CC. Here, the aforementioned 'cell' should be distinguished from a generally used 'cell' as an area that the base station covers.

CCs may have different sizes (i.e., bandwidths). For example, when 5 CCs are used for configuring a 70 MHz bandwidth, it may be configured using 5 MHz carrier (CC #0)+20 MHz carrier (CC #1)+20 MHz carrier (CC #2)+20 MHz carrier (CC #3)+5 MHz carrier (CC #4).

Figure 9:
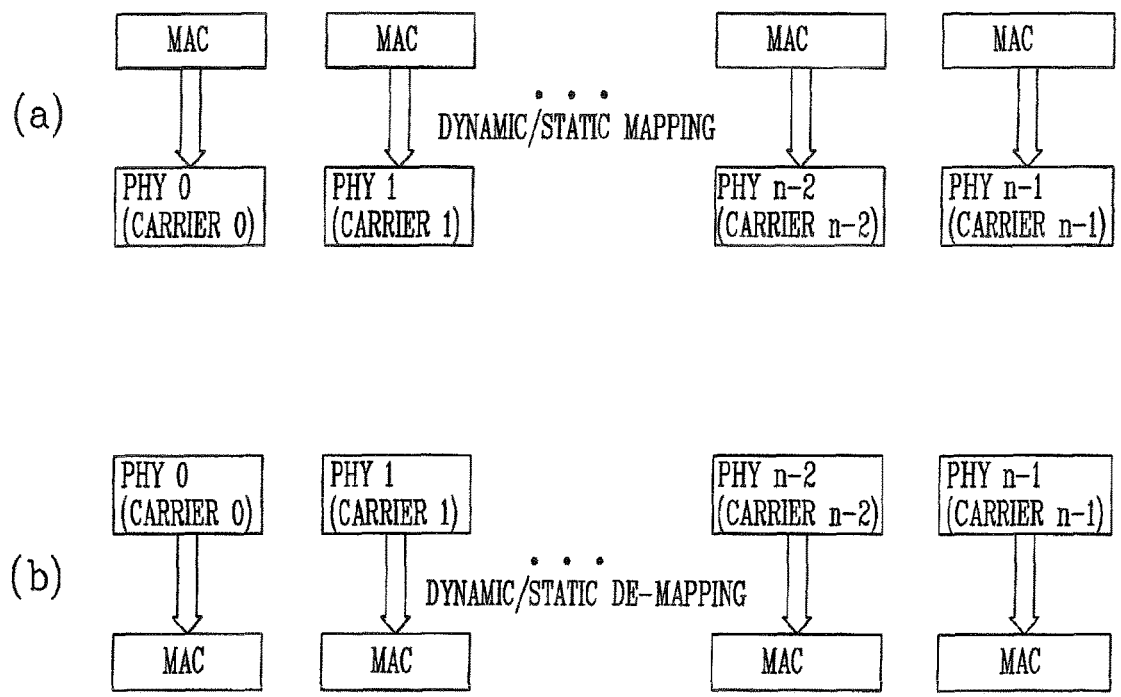
FIG. 9 is a view illustrating (a) a concept that multiple carriers are managed by a plurality of MACs of a base station, and (b) a concept that multiple carriers are managed by a plurality of MACs of a UE.

Description of FIGS. 9(a) and 9(b)

FIGS. 9(a), 9(b), 10(a) and 10(b) show a configuration of a physical layer (PHY) and a layer 2 (MAC) of a random cell or a UE for transmitting a plurality of uplink or downlink carrier bands allocated thereto.

FIG. 9(a) is a view illustrating a concept that multiple carriers are managed by a plurality of MACs of a base station, and FIG. 9(b) is a view illustrating a concept that multiple carriers are managed by a plurality of MACs of a UE.

As shown in FIGS. 9(a) and 9(b), each MAC may control each carrier in a one-to-one (1:1) correspondence. In a system supporting a plurality of carriers, the carriers may be used to be contiguous or non-contiguous to each other. This is applied both to uplink and downlink transmissions. A Time Division Duplex (TDD) system is configured to operate N carriers, and each carrier is configured to be able to perform UL transmission and DL transmission. In an FDD system, a plurality of carriers can be used by dividing them for a UL usage and a DL usage. The FDD system can configure an asymmetric carrier aggregation system by allowing the number of carriers and the bandwidth aggregated in UL and DL transmissions to be different.

Figure 10:
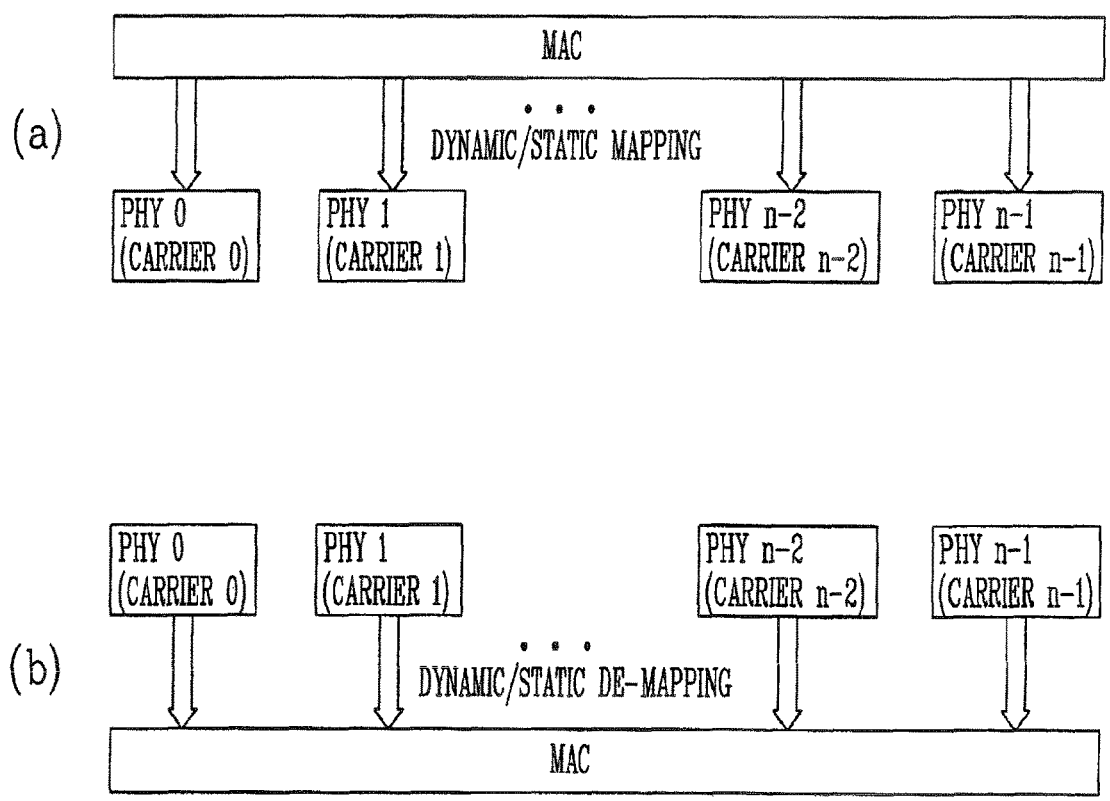
FIG. 10 is a view illustrating (a) a concept that multiple carriers are managed by one MAC of a base station, and (b) a concept that multiple carriers are managed by one MAC of a UE.

Description of FIGS. 10(a) and 10(b)

FIG. 10(a) is a view illustrating a concept that multiple carriers are managed by one MAC of a base station, and FIG. 10(b) is a view illustrating a concept that multiple carriers are managed by one MAC of a UE.

As shown in FIGS. 10(a) and 10(b), one MAC performs transmission and reception by managing and operating one or more frequency carriers. Since the frequency carriers managed by the one MAC does not have to be contiguous to each other, this may enable flexible resource management. In FIGS. 10(a) and 10(b), it is assumed that one PHY is one component carrier (CC) for the sake of explanation. Here, one PHY does not always mean an independent RF device. One independent RF device generally indicates one PHY, but may not always be limited thereto. The one RF device may alternatively include several PHYs.

The PDCCH, which transmits control information for L1/L2 control signaling generated from a packet scheduler of the MAC layer for supporting the configuration in FIGS. 10A and 10B, may be mapped to a physical resource for each separate component carrier, thereby being transmitted.

Especially, the PDCCH, which includes control information related to channel allocation or grant for the PDSCH or PUSCH transmission for a specific user equipment, may be separately encoded for each component carrier to which the corresponding PDSCH/PUSCH is transmitted. Such PDCCH may be referred to as a separate coded PDCCH. Unlike to this method, control information for physical shared channel transmission of multiple component carriers may be configured as a single PDCCH so as to be transmitted. And, such PDCCH may be referred to as a joint coded PDCCH.

In order to support downlink or uplink carrier aggregation, a connection between the base station and a specific UE or relay is required to be set up to be appropriate for a unique condition of the specific terminal or relay, such that the PDCCH and/or the PDSCH can be transmitted for transmission of control information and data, or component carriers corresponding to targets of measurement and/or reporting as a preparation for the connection setup may be allocated. This is called a component carrier allocation according to a purpose.

Here, if an L3 Radio Resource Management (RRM) controls CC allocation information, the base station may transmit the CC allocation information through RRC signaling specific for UEs or relays (UE-specific or relay-specific RRC signaling) according to a dynamic characteristic of the control, or through PDCCHs as L1/L2 control signaling or other dedicated physical control channels for transmitting only the control information.

Figure 11:
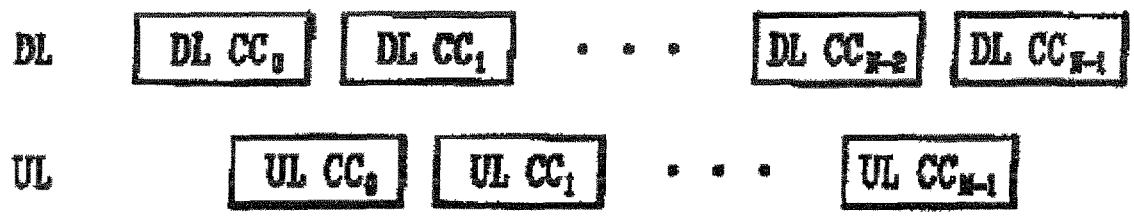
FIG. 11 is a view illustrating Component Carriers (CCs) configuring downlink and uplink for connection between a UE or a relay and a base station or relay in an LTE-A system.

Description of FIG. 11

Hereinafter, description will be given of a method for setting a timing synchronization between multiple carriers when one cell supports the multiple carriers in a wireless communication system. Especially, description will be given of a method in which a cell and UE supporting a carrier aggregation establish a subframe boundary between carriers in an LTE-A system as one example of the wireless communication system. Description disclosed herein is given based on the LTE-A system, but other radio communication standardization to which the same concept can be applied may also be applied.

FIG. 11 is a view illustrating Component Carriers (CCs) configuring downlink and uplink for connection between a UE or a relay and a base station or relay in an LTE-A system.

Referring to FIG. 11, basic DL CCs and UL CCs allocated by a random base station or a random relay are shown. For example, a case is shown in which the number of DL CCs is set to N, and the number of UL CCs is set to M. Here, the number of DL CCs may be the same as or different from the number of UL DCs.

In the LTE-A system, the DL CCs may be divided into three types. The first type CC may be a backward compatible CC which supports a backward compatibility of an LTE rel-8 UE. The second type CC may be a non-backward compatible CC which LTE UEs are unable to access, namely, supports only LTE-A UEs. Also, the third type CC may be an extension CC.

The first type CC, namely, the backward compatible CC is a CC, by which a Reference Signal (RS), P-SCH/S-SCH and P-BCH as well as the PDCCH and the PDSCH are transmitted according to the LTE structure so as to allow for connection of the LTE UE.

The second type CC, namely, the non-backward compatible CC, is a CC, by which the PDCCH, the PDSCH, the RS, the P-SCH/S-SCH and P-BCH are transmitted only in a transformed format such that a connection of the LTE UE is not allowed.

As such, the first type CC is a CC for allowing both the LTE UE and the LTE-A UE to access a cell (or base station) through the corresponding CC, and the second type CC (i.e., non-backward compatible CC) is a CC for allowing access of only the LTE-A UE. On the other hand, the third type CC, namely, the extension CC, is a CC which does not allow an access of any UE through the corresponding CC. The third type CC is a sub CC of the first or second type CC. The third type CC, namely, the extension CC does not allow transmission of the P-SCH/S-SCH, PBCH and PDCCH. Every resource of the third type CC may be used for the transmission of the PDSCH of the UE or operate in a sleep mode when it is not scheduled for the corresponding PDSCH. The base station or relay may not transmit control information to the UE through the third type CC.

That is, the first type CC and the second type CC may be a stand-alone CC type which is always necessary to configure one cell or configures one cell, and the third type CC may be a non-stand-alone CC type which should be present together with one or more stand-alone CCs.

Various forms of RSs may be used according to a definition of each sub frame. The RS may be divided into a demodulation RS and a measurement RS according to usage thereof.

The demodulation RS is basically used to receive data in a Multiple Input Multiple Output (MIMO) system. In this case, the RS may preferably be transmitted together with data. It is also important to design the RS to have a high channel estimation performance.

The measurement RS may be used to feedback channel information for a link adaptation. The measurement RS may be used to calculate CQI, PMI and RI. In this case, there is no problem even when the measurement RS is transmitted according to a channel information feedback period. The measurement RS may operate without trouble even when it has a lower channel estimation performance than the demodulation RS.

Also, the RS may be divided according to a type into a Common Reference Signal (CRS), a Dedicated Reference Signal (DRS) and a combined RS of the CRS and the DRS.

The UE may inform the base station of feedback information, such as CQI, PMI or RI by measuring the CRS, and the base station may perform a frequency domain scheduling using the feedback information received from the UE.

In the LTE system, the CRS may be used for both demodulation and measurement. In the LTE-A system, the CRS and a Channel State Indication RS (CSI-RS) may be used for measurement usage, and a DeModulation RS (DM RS) may be used for demodulation.

The UE using the carrier aggregation in the LTE-A system may be allocated with one or more CCs from the base station. When the extension CC as the third type CC is included in the CCs allocated to the UE, the UE has to perform measurement for the extension CC.

For measurement of the UE in the LTE-A system, CRS, CSI-RS and SCH may all be used. When the CRS is used for measurement in the extension CC, an unnecessary processing process may increase due to the measurement RS. When the SCH is used for measurement, it may make UEs, which support the SCH, difficult to access according to whether or not the SCH is an SCH defined in the LTE or a newly defined SCH.

In the wireless communication system in accordance with the exemplary embodiment, in order to reduce inefficiency of resource usage and unnecessary processing and increase efficiency of measurement, the base station may set control information, which is to be used for the purpose of measurement in a specific extension CC.

Hereinafter, description will be given of a method in which a base station sets control information for channel quality measurement in a wireless communication system in accordance with an exemplary embodiment.

Figure 12:
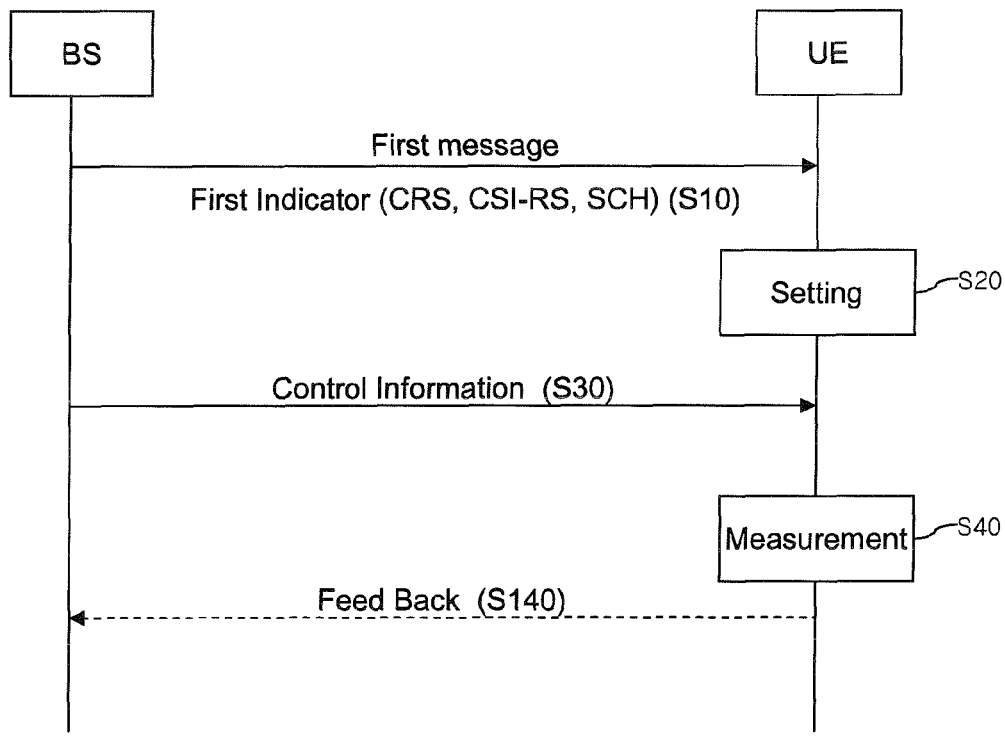
FIGS. 12 and 13 are views illustrating a method for performing channel quality measurement by a UE in a wireless communication system supporting a carrier aggregation in accordance with an exemplary embodiment disclosed in this specification.

Description of FIG. 12

Figure 13:
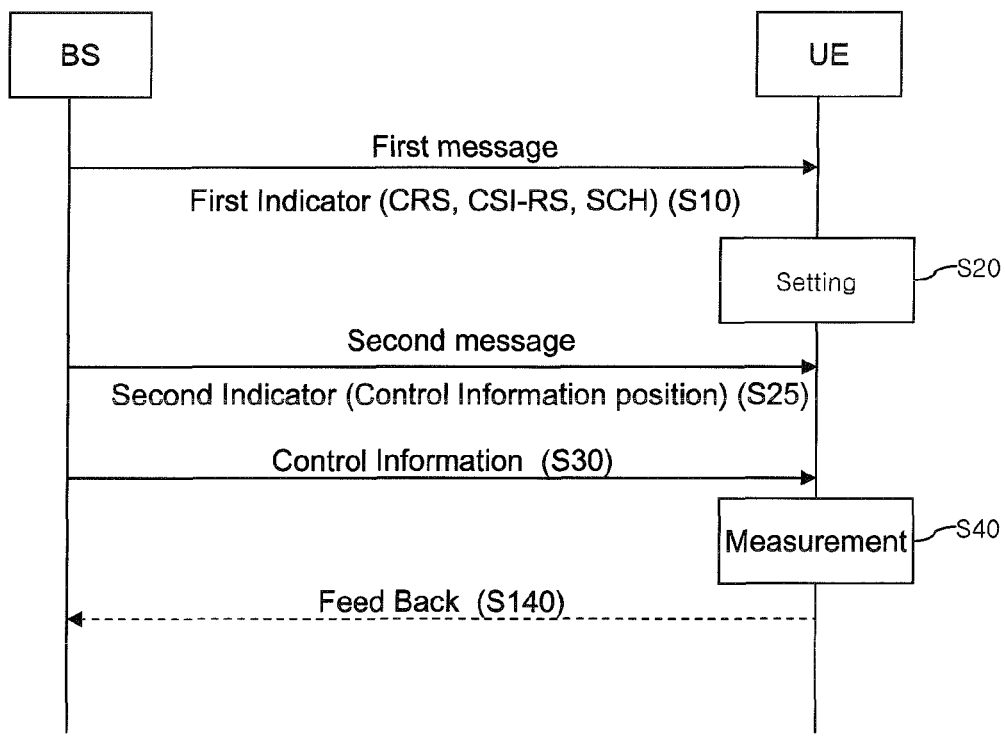

FIGS. 12 and 13 are views illustrating a method for performing channel quality measurement by a UE in a wireless communication system supporting a carrier aggregation in accordance with an exemplary embodiment disclosed in this specification.

In the wireless communication system according to an exemplary embodiment of the present disclosure, the UE has to set which type of control information is to be used for measurement in the extension CC. To this end, the base station may transmit an indicator, which indicates one of control information to be used for setting, to the UE. The UE may then check the received indicator, receive the control information indicated by the indicator, and perform the measurement.

First, the base station transmits a first message, which includes an indicator indicating control information to be used for measurement in the extension CC, to the UE (S10).

The first message including the indicator indicating the control information may be transmitted once during maintaining RRC connection with the base station after establishment of the RRC connection. Alternatively, the first message may be transmitted in each subframe such that the UE can dynamically set a measurement method by deciding which control information is to be used in each subframe. Or, the first message may be transmitted periodically. That is, the base station may transmit the first message to the UE once every period specified. In case that the base station indicated the UE to perform measurement in the extension CC using CRS, and then the base station indicates the measurement using CRS or CSI-RS in a next period. Or, the base station may notify a subframe in which CRS is transmitted of the UE, or periodically indicate that the UE needs to use CSI-RS in which subframe. Also, it may be predetermined that which measurement mean (that is, one from among CRS, CSI-RS and SCH) is used for measurement in the extension CC, and the first message may be transmitted periodically or on an event-driven basis to indicate to use another measurement mean other than the predetermined one when the another measurement mean is used.

The control information indicated by the indicator may indicate a measurement means in the extension CC, and may be one of CRS, CSI-RS, and SCH.

Next, after reception of the first message including the indicator indicating the control information, the UE may check the indicator, and accordingly perform a setting process for measurement in the extension CC (S20). The setting process is a process of being ready to receive the control information indicated by the indicator.

The base station may transmit control information for measurement in the extension CC to the UE (S30). Upon reception of the control information, the UE may perform the measurement (S40), and transmit the measurement result to the base station through feedback information (S50).

In accordance with a first exemplary embodiment, the first message including the indicator indicating the control information may be a PDCCH as an L1 control signaling. In the first exemplary embodiment, the base station may instruct the UE to dynamically set the measurement method in every subframe by including the indicator of the control information for the measurement in the PDCCH of each subframe transmitted thereby.

In accordance with a second exemplary embodiment, the base station may transmit the indicator indicating the control information to the UE using an upper layer signaling message. In the second exemplary embodiment, the first message transmitted by including the indicator may be, for example, an RRC signaling message. The base station may instruct the UE to set the measurement method by transmitting the indicator of the control information for the measurement using an RRC signaling message once after establishment of an RRC connection or according to a specific period.

In accordance with a third exemplary embodiment, the first message including the indicator indicating the control information may be a broadcast message. In the third exemplary embodiment, the base station may instruct the UE to set the measurement method by transmitting the indicator of the control information for the measurement using the broadcast message while the RRC connection is in an established state.

Also, in accordance with a variation of the present disclosure, control information, which is used for measurement in the extension component carrier, has been basically set between the base station and the UE. When desiring to change the basic setting, the base station may transmit the indicator by using an L1 control signaling message or an upper layer signaling message. In the variation, the base station may transmit the first message including the indicator periodically or on an event-driven basis.

In accordance with another exemplary embodiment, the base station may transmit the indicator indicating control information for setting the measurement method in the extension CC through a message, which is used upon a cell-specific carrier configuration for the extension CC.

Description of FIG. 13

In the meantime, in accordance with a fourth exemplary embodiment, after transmitting the first message including the indicator of the control information for the measurement in the extension CC (S10), the base station may additionally transmit a second message including a second indicator, which indicates a position of the control information, to the UE (S25). Upon reception of the second indicator, the UE may acquire the control information for the measurement by checking the position of the control information based on the second indicator.

For example, the second indicator may indicate a position of a subframe, in which the CRS used for the measurement in the extension CC is transmitted, or a position of a subframe in which a CSI-RS is to be used. The second message including the second indicator may be periodically transmitted.

In the aforementioned exemplary embodiments, when the base station transmits the indicator, which indicates the CRS or CSI-RS as the control information for channel measurement, to the UE, it may be inefficient that the UE which has received the control information processes the CRS or CSI-RS within each subframe. To overcome this, in accordance with another variation of the present disclosure, the base station may transmit control information by reducing a Reference Signal Density (RSD). That is, the base station may transmit an indicator, which indicates the use of the reduced RSD, to the UE in the first message transmitting step (S10), and transmit a CRS or CSI-RS with the reduced RSD in the control information transmitting step (S30). The control information with the reduced RSD may use a part of CRS pattern or CSI-RS pattern of LTE for the purpose of measurement.

For example, in case of a CRS, since the RSDs of first and second antennas are higher than those of third and fourth antennas, the base station may transmit the CRS with reduced densities of the first and second antennas to the UE so as to reduce the RSD. As another example, the CRS may exist over entire time and frequency domains in a subframe. Thus, to reduce the RSD, the base station may transmit a CRS with a first or second slot removed. The aforementioned examples for reducing the RSD may also be equally applied to a case where the CSI-RS as the channel measurement control information is used.

Figure 14:
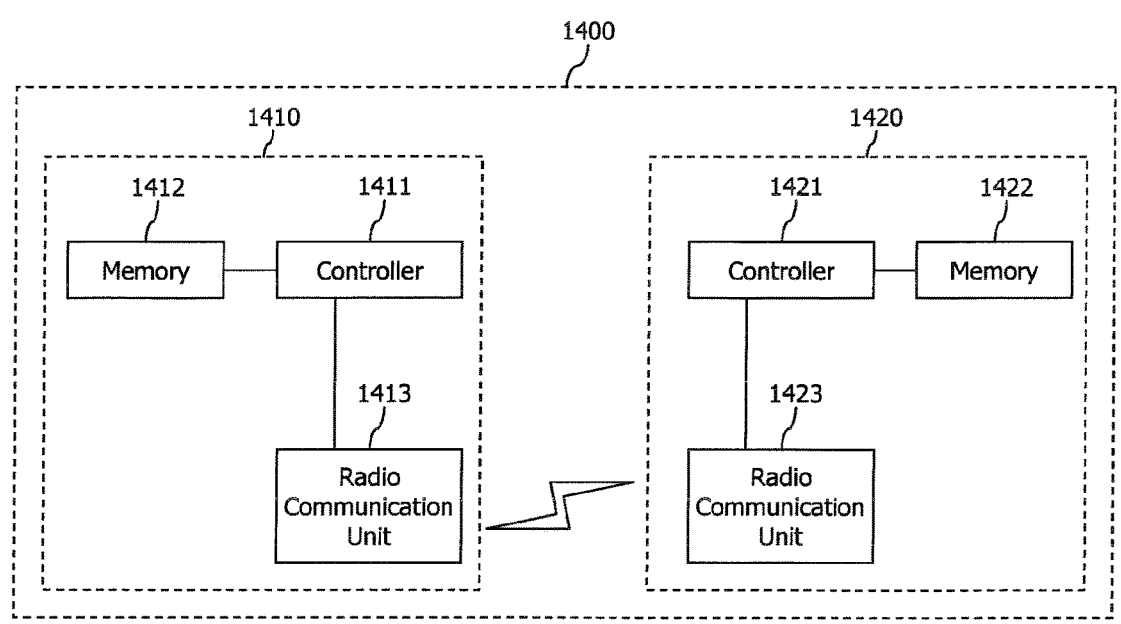
FIG. 14 is a block diagram illustrating a wireless communication system in accordance with an exemplary embodiment disclosed in this specification.

Description of FIG. 14

FIG. 14 is a block diagram illustrating a wireless communication system in accordance with an exemplary embodiment disclosed in this specification. The wireless communication system 1400 may include a base station 1410 and a UE 1420.

The base station 1410 may include a controller 1411, a memory 1412, and a Radio Frequency (RF) unit 1413.

The controller 1411 may implement the proposed functions, processes and/or methods. Radio interface protocol layers may be implemented by the controller 1411.

The controller 1411 may operate multiple carriers, and control an extension component carrier to be established.

The memory 1412 may be connected to the controller 1411 so as to store protocols or parameters for operating the multiple carriers. The RF unit 1413 may be connected to the controller 1411 to transmit and/or receive radio signals.

The UE 1420 may include a controller 1421, a memory 1422 and an RF unit 1423.

The controller 1421 may implement the proposed functions, processes and/or methods. Radio interface protocol layers may be implemented by the controller 1421. The controller 1421 may operate multiple carriers, and perform measurement in an extension component carrier.

The memory 1422 may be connected to the controller 1421 so as to store protocols or parameters for operating the multiple carriers. The RF unit 1423 may be connected to the controller 1421 to transmit and/or receive radio signals.

The controller 1411, 1421 may include an Application-Specific Integrated Circuit (ASIC), another chip set, a logical circuit and/or a memory processor. The memory 1412, 1422 may include a Read-Only Memory (ROM), Random Access Memory (RAM), a flash memory, a memory card, a storage medium and/or other storage devices. The RF unit 1413, 1423 may include a baseband circuit for processing a radio signal. When exemplary embodiments are implemented by software, the aforementioned methods may be implemented by modules (processes, functions, etc.) which perform the aforementioned functions. The module may be stored in the memory 1412, 1422, and executed by the controller 1411, 1421. The memory 1412, 1422 may be disposed inside or outside the controller 1411, 1421, and be connected to the controller 1411, 1421 by various well-know elements.

What is claimed is:

1. A method for channel measurement when a mobile terminal is configured with a primary component carrier and a secondary component carrier, the method performed by the mobile terminal and comprising:
receiving, by the mobile terminal, configuration information from a base station; and deriving, by the mobile terminal, channel measurement in the secondary component carrier according to the received configuration information, wherein when the received configuration information includes indication information for the channel measurement in the secondary component carrier, the derived channel measurement in the secondary component carrier is based on a channel state information reference signal (CSI-RS), and wherein when the received configuration information does not include the indication information for the channel measurement in the secondary component carrier, the derived channel measurement in the secondary component carrier is based on a cell-specific reference signal (CRS).

2. The method of claim 1, further comprising reporting the derived channel measurement to the base station.

3. The method of claim 1, wherein when the configuration information is received through a radio resource control (RRC) signaling message, the configuration information is received once or periodically after establishing an RRC connection.

4. The method of claim 1, wherein the configuration information is received once after establishing a radio resource control (RRC) connection when the configuration information is received through a broadcast message.

5. The method of claim 1, further comprising receiving information on a position of the CSI-RS and the CRS.

6. The method of claim 1, wherein the CRS or the CSI-RS has a reduced reference signal density (RSD).

7. The method of claim 1, wherein the CRS has a reduced reference signal density (RSD) for at least one of first and second antennas.

8. The method of claim 1, wherein the CRS is received on either a first slot or a second slot in a subframe.

9. A mobile terminal configured to perform channel measurement when the mobile terminal is configured with a primary component carrier and a secondary component carrier, the mobile terminal comprising:

a transceiver that transmits and receives a radio signal; and a controller that:
controls the transceiver to receive configuration information from a base station, and
derives channel measurement in the secondary component carrier according to the received configuration information, wherein when the received configuration information includes indication information for the channel measurement in the secondary component carrier, the derived channel measurement in the secondary component carrier is based on a channel state information reference signal (CSI-RS), and wherein when the received configuration information does not include the indication information for the channel measurement in the secondary component carrier, the derived channel measurement in the secondary component carrier is based on a cell-specific reference signal (CRS).

10. The mobile terminal of claim 9, wherein the controller is further configured to report the derived channel measurement to the base station.

11. The mobile terminal of claim 9, wherein when the configuration information is received through a radio resource control (RRC) signaling message, the configuration information is received once or periodically after establishing an RRC connection.

12. The mobile terminal of claim 9, wherein the configuration information is received once after establishing a radio resource control (RRC) connection when the configuration information is received through a broadcast message.

13. The mobile terminal of claim 9, wherein the controller is further configured to receive information on a position of the CSI-RS and the CRS.

14. The mobile terminal of claim 9, wherein the CRS or the CSI-RS has a reduced reference signal density (RSD).

15. The mobile terminal of claim 9, wherein the CRS has a reduced reference signal density (RSD) for at least one of first and second antennas.

16. The mobile terminal of claim 9, wherein the CRS is received on either a first slot or a second slot in a subframe.

* * * * *